US012639195B2

(12) United States Patent　　　　(10) Patent No.: US 12,639,195 B2
Huth et al.　　　　　　　　　　　　　(45) Date of Patent: May 26, 2026

(54) METHOD FOR TESTING A COMPUTER PROGRAM

(71) Applicant: Robert Bosch GmbH, Stuttgart (DE)

(72) Inventors: Christopher Huth, Heilbronn (DE);
Max Camillo Eisele, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 274 days.

(21) Appl. No.: 18/598,291

(22) Filed: Mar. 7, 2024

(65) Prior Publication Data

US 2024/0311276 A1　　Sep. 19, 2024

(30) Foreign Application Priority Data

Mar. 15, 2023　(DE) ..................... 10 2023 202 348.2

(51) Int. Cl.
*G06F 12/00*　　　(2006.01)
*G06F 11/362*　　(2025.01)

(52) U.S. Cl.
CPC ................................ *G06F 11/3636* (2013.01)

(58) Field of Classification Search
CPC ............................ G06F 11/3698; G06F 12/00
See application file for complete search history.

(56) References Cited

U.S. PATENT DOCUMENTS

| | | | | |
|---|---|---|---|---|
| 12,507,743 | B2 * | 12/2025 | Schwartz ................ | A41D 1/002 |
| 12,511,676 | B1 * | 12/2025 | Mogadala .......... | G06Q 30/0603 |
| 2006/0294432 | A1 * | 12/2006 | Thelen ................... | G06F 11/362 |
| | | | | 714/E11.21 |
| 2007/0079292 | A1 * | 4/2007 | Chen ..................... | G06F 11/362 |
| | | | | 717/127 |
| 2012/0151267 | A1 * | 6/2012 | Bhattacharjee ..... | G06F 11/3624 |
| | | | | 714/E11.208 |
| 2019/0370038 | A1 * | 12/2019 | Villmow ............. | G06F 9/30043 |
| 2020/0151088 | A1 * | 5/2020 | Gu ....................... | G06F 15/7807 |

* cited by examiner

*Primary Examiner* — Philip Wang
(74) *Attorney, Agent, or Firm* — NORTON ROSE FULBRIGHT US LLP

(57) ABSTRACT

A method for testing a computer program. The method includes: executing the computer program until a memory allocation command is activated for allocating a memory region; expanding the memory region by a protection zone having at least one memory location; allocating the expanded memory region; setting a watchpoint on each of one or more memory locations of the protection zone; continuing the execution of the computer program; and displaying, for each set watchpoint, that the computer program has a bug if the set watchpoint is triggered.

9 Claims, 1 Drawing Sheet

METHOD FOR TESTING A COMPUTER PROGRAM

CROSS REFERENCE

The present application claims the benefit under 35 U.S.C. § 119 of German Patent Application No. DE 10 2023 202 348.2 filed on Mar. 15, 2023, which is expressly incorporated herein by reference in its entirety.

FIELD

The present disclosure relates to a method for testing a computer program.

BACKGROUND INFORMATION

An essential part in the development of software applications is testing and, if bugs are found, a corresponding debugging. In particular, bugs that result in the failure of an application should be identified and corrected. An important aspect here is testing with regard to important memory regions not being accessed unintentionally (or by an attacker), i.e., testing with memory monitoring, as is done by a so-called (memory) sanitizer. The compilation and testing of software on established desktop and server hardware, e.g., x86, with the aid of various sanitizers is a measure by which bugs, such as, for example, the heartbleed bug that previously went undetected for a long time, can be discovered.

Comprehensive testing, which also includes such memory monitoring, is important, particularly for computer programs in embedded systems, such as control devices for a vehicle, which are often safety-relevant. However, sanitizers that are used for desktop and server hardware are not usable or only poorly usable for such systems because embedded systems typically have limited resources and such sanitizers need considerable resources and thus cannot be used or can even influence the execution of the computer program in such a way that no error arises in the first place.

Methods for testing computer programs that make possible memory monitoring and are suitable for embedded systems are therefore desirable.

SUMMARY

According to various embodiments, the present invention relates to a method for testing a computer program, comprising executing the computer program until a memory allocation command is activated for allocating a memory region, expanding the memory region by a protection zone having at least one memory location, allocating the expanded memory region, setting a watchpoint on each of one or more memory locations of the protection zone, continuing the execution of the computer program, and, for each set watchpoint, displaying that the computer program has a bug if the set watchpoint is triggered.

The method described above makes testing with memory monitoring possible (i.e., with a sanitizer) on an embedded system with the aid of a debugger. This is particularly suitable when testing with fuzzing, since fuzzing can also be implemented in a debugger-controlled manner and can thus be used effectively for embedded systems.

According to an example embodiment of the present invention, sanitizers can be implemented by means of code instrumentation. For this purpose, however, either the source code must be available or an instruction-set-specific instrumentation based on the binary file (binary instrumentation)

is required, which is very vulnerable. An alternative instrumentation based on an emulator is also very platform-specific, and each embedded platform needs its own emulator. The method described above makes testing possible using a debugger-controlled sanitizer and requires no instrumentation or emulation and can therefore be applied in many cases.

Various exemplary embodiments are specified below.

Exemplary embodiment 1 is a method for controlling a robot, as described above.

Exemplary embodiment 2 is a method according to exemplary embodiment 1, comprising deleting the watchpoints in response to releasing the memory region (i.e., in particular in the case of a release command for the memory region in the computer program).

The memory locations of the protection zone can thus be reassigned without a bug possibly being displayed even though the memory region has already been released.

Exemplary embodiment 3 is a method according to exemplary embodiment 1 or 2, wherein the protection zone contains at least one memory location in front of and at least one memory cell behind the memory region, and at least one watchpoint is set on a memory location of the protection zone in front of the memory region and at least one watchpoint on a memory location of the protection zone behind the memory region.

In this way, accesses that go beyond the memory region can be detected, regardless of the direction in which they do so.

Exemplary embodiment 4 is a method according to any of exemplary embodiments 1 to 3, comprising executing the computer program on an embedded system and setting the watchpoint and the breakpoints by means of a test system connected to the embedded system.

According to various embodiments, testing a computer program for an embedded system on the embedded system itself is made possible, including memory monitoring.

Exemplary embodiment 5 is a method according to any of exemplary embodiments 1 to 4, comprising adapting information about the position of the memory region in the memory in accordance with a shift in the position of the memory region by expanding the memory region through the protection zone.

For example, an initial address of the memory region is accordingly increased if one or more memory locations of the protection zone are inserted in front of the memory region (and are allocated at the beginning of the free memory). This ensures that accesses to the memory region that use this information are made correctly. The expansion around the protection zone can then remain transparent for the computer program.

Exemplary embodiment 6 is a method according to any of exemplary embodiments 1 to 5, comprising expanding the memory region around the protection zone by means of a debugger.

This makes it possible to expand the protection zone transparently for the computer program. The debugger (which is also used for setting the breakpoints and watchpoint) can also be used for adapting the information about the position of the memory region in the memory.

Exemplary embodiment 7 is a method according to any of the exemplary embodiments 1 to 6, comprising testing the computer program by means of fuzzing with a plurality of test cases, wherein each test case specifies a respective set of (one or more) memory allocation commands and has the set specified for the test case for each memory allocation command: executing the computer program until the memory allocation command is activated for allocating a memory region, expanding the memory region by a protection zone having at least one memory location, allocating the expanded memory region, setting a watchpoint on each of one or more memory locations of the protection zone, continuing the execution of the computer program; and displaying, for each set watchpoint, that the computer program has a bug if the set watchpoint is triggered.

The memory monitoring can thus be part of a fuzz test, wherein the fuzzer can select the memory allocations that are being monitored. As a result, bugs can be found regarding accesses that go beyond an allocated memory region (i.e., an overflow) for many different inputs of the computer program and subprograms of the computer program, even when only a certain number of breakpoints and watchpoints are available on the (e.g., embedded) system on which the computer program is running.

Exemplary embodiment 8 is a method according to any of exemplary embodiments 1 to 7, wherein the computer program is a control program for a robot device, and the robot device is controlled depending on a result of testing the computer program with the computer program.

In other words, a method for controlling a robot device can be provided, in which security against overflow of a memory region in the heap memory is ensured by testing by means of a sanitizer.

Exemplary embodiment 9 is a test arrangement which is set up to carry out a method according to any of exemplary embodiments 1 to 8.

Exemplary embodiment 10 is a computer program comprising commands that, when executed by a processor, cause the processor to carry out a method according to any of exemplary embodiments 1 to 8.

Exemplary embodiment 11 is a computer-readable medium which stores commands that, when executed by a processor, cause the processor to carry out a method according to any of exemplary embodiments 1 to 8.

In the figures, similar reference signs generally refer to the same parts throughout the various views. The figures are not necessarily true to scale, with emphasis instead generally being placed on the representation of principles of the present invention. In the following description, various aspects are described with reference to the figures.

DETAILED DESCRIPTION OF EXAMPLE EMBODIMENTS

The following detailed description relates to the figures, which show, by way of explanation, specific details and aspects of this disclosure in which the present invention can be executed. Other aspects may be used and structural, logical, and electrical changes may be performed without departing from the scope of protection of the present invention. The various aspects of this disclosure are not necessarily mutually exclusive, since some aspects of this disclosure may be combined with one or more other aspects of this disclosure to form new aspects.

Various examples are described in more detail below.

Figure 1:
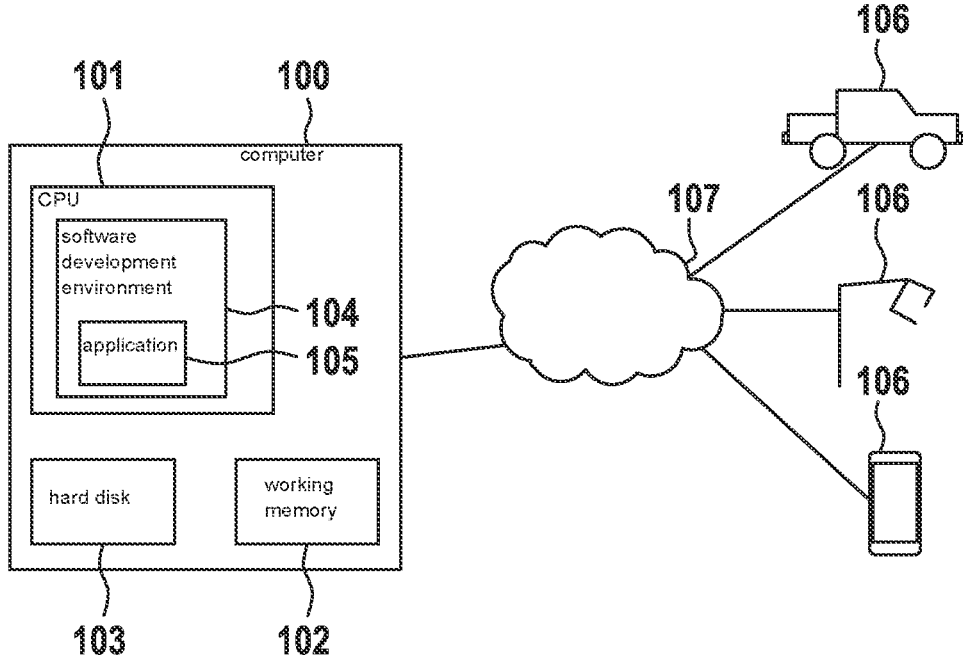
FIG. 1 shows a computer for the development and/or testing of software applications, according to an example embodiment of the present invention.

FIG. 1 shows a computer 100 for the development and/or testing of software applications.

The computer 100 comprises a CPU (central processing unit) 101 and a working memory (RAM) 102. The working memory 102 is used for loading program code, e.g., from a hard disk 103, and the CPU 101 executes the program code.

In the present example, it is assumed that a user intends to develop and/or test a software application with the computer 100.

For this purpose, the user runs a software development environment 104 in the CPU 101.

The software development environment 104 makes it possible for the user to develop and test an application 105 for different devices 106, i.e., target hardware, such as embedded systems for controlling robot devices, including robot arms and autonomous vehicles, or also for mobile (communication) devices. For this purpose, the CPU 101 can run an emulator as part of the software development environment 104 in order to simulate the behavior of the particular device 106 for which an application is being or has been developed. If it is used only for testing software from another source, the software development environment 104 can also be regarded as or configured as a software testing environment.

The user can distribute the finished application to corresponding devices 106 via a communication network 107. Rather than via a communication network 107, this can also be done in another way, for example by means of a USB stick.

However, before this happens, the user should test the application 105 in order to prevent an improperly functioning application from being distributed to the devices 106.

One test method is so-called fuzzing. Fuzzing or fuzz-testing is an automated software test method in which invalid, unexpected or random data are supplied as inputs to a computer program to be tested. The program is then be monitored for exceptions such as crashes, missing failed code assertions or potential memory leaks.

Typically, fuzzers (i.e., test programs that use fuzzing) are used to test programs that process structured inputs. This structure is for example specified in a file format or in a file format or protocol and distinguishes between valid and invalid inputs. An effective fuzzer generates semi-valid inputs that are "valid enough" not to be rejected immediately by the input parser of the program to be tested, but "invalid enough" to cover unexpected behaviors and borderline cases that are not being handled properly in the program to be tested.

The terminology used in connection with fuzzing is described below:

Fuzzing or fuzz-testing is the automated testing process of sending randomly generated inputs to a target program (program to be tested) and observing its reaction.

A fuzzer or a fuzzing engine is a program that automatically generates inputs. It is therefore not linked to the software to be tested, and neither is any instrumentation performed. However, it has the ability to instrument code, generate test cases, and run programs to be tested. Conventional examples are AFL fuzzer and libFuzzer.

A fuzz target is a software program or a function that is to be tested by fuzzing. A main feature of a fuzz target should be that it accepts potentially untrusted inputs that are generated by the fuzzer during the fuzzing process.

A fuzz test is the combined version of a fuzzer and a fuzz target. A fuzz target can then be instrumented code in which a fuzzer is linked to its inputs (i.e., delivers them). A fuzz test can be executed. A fuzzer can also start, observe, and stop a plurality of fuzz tests (normally hundreds or thousands per second), each with a somewhat different input generated by the fuzzer.

A test case is a specific input and a specific test run from a fuzz test. Normally, runs of interest with regard to reproducibility are saved (finding new code paths or crashes). In this way, a specific test case with the corresponding input can also be run on a fuzz target which is not connected to a fuzzer, e.g., the release version of a program.

Coverage-guided fuzzing uses code coverage information as feedback during fuzzing in order to detect whether an input has caused the execution of new code paths or blocks.

Generation-based fuzzing uses prior knowledge about the target program (fuzz target) in order to create test inputs. An example of such prior knowledge is a grammar which corresponds to the input specification of the fuzz target, i.e., the input grammar of the fuzz target (i.e., of the program to be tested).

Static instrumentation is the insertion of instructions into a program (to be tested) in order to obtain feedback about its execution. It is usually realized by the compiler and can indicate, for example, the code blocks reached during execution.

Dynamic instrumentation is the control of the execution of a program (to be tested) during runtime in order to generate feedback from the execution. It is usually realized by operating system functionalities or by the use of emulators.

A debugger is a device or a program that can control a target device or target program and can provide functions, e.g., for retrieving register or memory values and for pausing and executing the target program in single steps.

A breakpoint is set via a debugger on an instruction of the target program or device in order to stop execution when it is reached and to inform the controlling process about this.

Via a debugger a data watchpoint is set on a memory address of a target program or target device in order to stop execution when the memory address is accessed, and to inform the controlling process by triggering an interrupt.

Embedded systems usually have a microcontroller that processes inputs and responds with outputs in order to fulfill a specific task. Although microcontrollers use the same memory model and are programmed with the same programming languages as normal user programs, their programs are significantly more difficult to test. In order to make debugging possible, microcontrollers usually offer the possibility of interrupting the program with breakpoints (stopping points), of running through the instructions of the program in single steps and of setting watchpoints on memory addresses. Watchpoints trigger an interrupt when the corresponding memory regions are accessed. Hardware breakpoints and watchpoints are typically implemented as physical registers in the debugging unit of a microcontroller, and their number is therefore limited and depends on the system in question. For example, the maximum number for a typical microcontroller is four breakpoints and two data watchpoints. Normally, watchpoints can distinguish between read and write accesses.

Breakpoints and watchpoints can be used in particular for realizing a debugger-controlled fuzzing, so that no instrumentation is required.

Fuzzing, also debugger-controlled fuzzing, is very efficient at finding bugs that trigger an observable behavior, such as a crash or reboot. However, entire classes of bugs cannot be observed, since with these the program silently fails. One example is the heartbleed bug. The core of the heartbleed bug was that it only reads beyond the boundary of an array whereas a write operation would have caused an easily observable segmentation error.

The heartbleed bug was only found with the aid of the address sanitizer (ASan). During the compilation of a program Asan inserts additional instructions, metadata and checks in order to prevent memory corruption bugs. If such sanitizer instructions are available in a program, more bugs can be found during debugging of the program than without a sanitizer. In particular, automated tests, such as fuzzing, shine when a sanitizer is provided in the program to be tested (i.e., in the fuzz target) in order to cover additional bugs.

For embedded systems, such as a data processing device with ARM architecture, such sanitizers are not so easy to use as for standard platforms, such as x86 platforms. There are several reasons for this:

An embedded system is too resource-limited to implement a sanitizer. For example, Asan needs double the memory, MSan (MemorySanitizer) needs 2.5 times the resources, and UBSan (UndefinedBehaviorSanitizer) even needs three times the working memory of the program.

Sanitizers increase the size of the compiled binary file. In the automotive industry, as a rule the size of such binary files almost corresponds to the available flash memory of the target hardware. An additional instrumentation of a sanitizer would not therefore fit into the flash memory.

Due to the additional instrumentation of sanitizers and the collection and tracking of metadata, the use of a sanitizer results in a slower runtime of a binary program on the hardware in question. Embedded systems are strongly dependent on asynchronous events, such as interrupts, and therefore sanitizers can lead to time-based false-positive errors, i.e., a sanitizer can introduce new errors during runtime.

As a rule, embedded systems do not have a user interface for displaying runtime errors. On x86 systems, a segmentation error for example is forwarded to STDERR, so that the user sees the crash. In contrast, embedded systems fail silently, i.e., without the user noticing and restart after such a crash.

According to various embodiments, an approach is therefore provided which makes possible the use of memory monitoring (i.e., a sanitizer functionality) for an embedded system, in particular such that the memory monitoring can be used for a debugger-controlled fuzzing. In this case, the memory monitoring itself is made possible with the aid of a debugger (or the debugger used for the fuzzing).

In debugger-based fuzzing, interactions between the system carrying out the test (and which corresponds, for example, to the computer 100) and the target system (target hardware, e.g., an embedded system, for example a target device 106) take place via a debugging connection (i.e., debugging interface), which is provided by a dedicated debugger hardware device, for example. The test input data are transmitted to the target system 106 in the form of an input vector, for example via WiFi or a CAN bus (depending on the type of target device 106), i.e., in this testing the communication network 107 is such a debugging connection (when distributing the tested software, the communication network can then be any other communication network).

The system which carries out the test, also referred to below as test system 100, controls the execution of the target program (i.e., of the program to be tested) in the target system via the debugging connection, i.e., starts execution and resumes execution after an interrupt (in particular an interrupt that has been triggered by a data watchpoint).

A debugger-controlled sanitizer does not require instrumentation or emulation, but only a debugging interface to the target system (e. g., an embedded system in which the software is run) with the possibility of setting breakpoints and watchpoints. This type of debugging interface and capabilities are generically and widely available, which leads to a broad and simple applicability of the approach described below. In addition, the memory of the target system is only slightly loaded, e. g., for metadata, since most sanitizer-related information is collected and stored on the host side of the debugger (i.e., in the system 100 under test). The size of the compiled binary file of the target program is not increased, since it can be used during testing in the same way as it is intended for the target system 106.

A debugger stops the target system when a breakpoint is reached. For this reason, the approach described below leads to time-based false alarms only in rare cases. These false alarms can also be excluded by other test techniques, e.g., by subsequent validation of a bug found in the target system. The use of a debugger also provides a good insight into the internals of a target system.

The approach described below is used for memory monitoring, i.e., the detection of an undesired writing or reading of memory regions by a program to be tested. Computer programs consist of instructions that act on the memory. In order to avoid the unintentional simultaneous use of memory locations, the memory is usually divided into different regions, namely stack, heap, and static memory.

The stack (whereby the call stack or procedure stack is meant here) is a continuously increasing memory region that offers subprograms space for their local variables. Each function is given its own memory region in the stack. Stack memory is assigned by decreasing the stack pointer (continuous memory). Stack frames for called functions are assigned by decreasing the stack base pointer and the stack pointer.

In C a memory region of the heap memory is assigned the required memory size, e.g., by calling the functions malloc, realloc or calloc, and the assigned memory region is released again with the free function and can be reused in a subsequent assignment request. Memory regions of the heap memory are normally used for long-lived variables which are shared by different functions.

For correct program execution, it is important that the limits of the assigned memory are not exceeded. It is the responsibility of the programmer to ensure correct memory accesses in memory-insecure languages such as C, C++. Neglecting the limits of the assigned memory can lead to serious safety incidents, such as remote code execution or data leaks.

According to one exemplary embodiment, allocations in the heap memory are initially tracked (i.e., detected) in order to detect overflows (reading, writing, or both) of memory regions in the heap memory. In the allocation of a memory region in the heap, a protection zone of prespecified size is defined before and/or behind the memory region. In this case, "before" and "behind" can, for example, refer to rising or falling addresses, i.e., one memory location is before another when it has a shorter address, or vice versa. An access (reading or writing or both) to a memory location belonging to the protection zone is regarded as erroneous.

The protection zone can contain a prespecified size (i.e., a given number of memory locations, e. g., one, two or more memory locations) before and/or behind the memory region. A memory location stores a word with a word length depending on the respective architecture (e.g., 32 bits) and is identified by a respective address.

For example, the test system 100 performs the following:
1. Setting breakpoints on memory allocation commands (i.e., generally on one memory allocation command) such as malloc, realloc and calloc.
2. When one of the memory allocation commands is called, an interrupt is triggered by the respective set breakpoint, and the value of the parameter displaying the size of the memory region that is to be allotted by the called memory allocation command (and is given in the call instruction of the memory allocation command) is increased by the prespecified size. This adaptation can be carried out by the test system 100 by means of the debugger. When the protection zone (or a part of the protection zone) is added at the end of the memory region to be allocated, any alignment requirements there may be (of the memory region in the memory) will be complied with. When the protection zone (or a part of the protection zone) is added at the beginning of the memory region to be allocated, the position of the memory region will shift accordingly. In this case, the test system suitably adapts the address that the memory allocation command returns to the computer program (so that the computer program has the information about the correct position of the allotted memory region in the memory).
3. The test system 100 sets watchpoints on the memory locations of the protection zone.
4. If one of the write watchpoints is triggered, an undesired memory access has occurred. In this case, the test system 100 therefore indicates that an error has occurred, which in turn can trigger the execution of a safety measure.

Table 1 illustrates a protection zone and the placing of watchpoints in a protection zone around a memory region (in this example for a buffer) in the heap memory. Each row symbolizes a memory location

TABLE 1

| | |
|---|---|
| . . . | <- remaining part of the heap memory |
| Protection zone | <- a watchpoint is set here |
| Buffer end | |
| . . . | |
| Buffer start | |
| Protection zone | <- a watchpoint is set here |
| . . . | <- remaining part of the heap memory |

Since the number of breakpoints and watchpoints can be limited, it is possible that not all memory regions can be monitored in this way. If this is the case, the test system can randomly select the subset of the memory regions which are to be monitored, or the memory regions are monitored one after the other in multiple runs of the target program (e.g., fuzz-test runs).

If a watchpoint is removed, for example because it is required elsewhere, a pattern can also be stored in the protection zone which makes it possible to check whether parts of the protection zone have been overwritten.

The watchpoints can be watchpoints that trigger during writing, reading, or both.

According to various embodiments, the memory region expanded by the protection zone is then allocated in the free region of the heap memory, typically next after the allocated region of the heap memory. The protection zone thus also occupies (previously free) memory locations.

Figure 2:
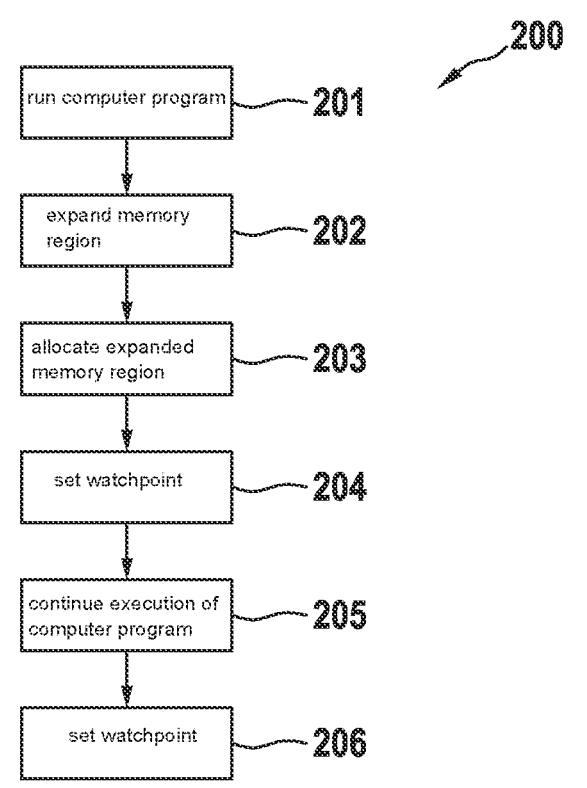
FIG. 2 shows a flowchart which represents a method for training a computer program according to one example embodiment of the present invention.

In summary, according to various embodiments, a method is provided as shown in FIG. 2.

FIG. 2 shows a flowchart 200 illustrating a method for testing a computer program according to an embodiment.

In 201, the computer program (to be tested) is run until a memory allocation command is called for allocating a memory region (i.e., an allocation command for dynamic memory, i.e., a memory region in the heap memory of the executing system).

In 202, the memory region (to be allotted) is expanded by a protection zone having at least one memory location (i.e., a protection zone which comprises at least one memory location). A memory location here corresponds to a memory location which can be provided with a watchpoint (i.e., a memory location for a data word of a word length dependent on the respective executing system, e.g., 32 bits).

In 203, the memory region (thus) expanded is allocated (in the memory of the system that executes the computer program).

In 204, a watchpoint is set on each of one or more memory locations of the protection zone.

In 205, the execution of the computer program is continued.

In 206, should the set watchpoint be triggered, for each set watchpoint it is displayed that the computer program has a bug.

The method in FIG. 2 can be carried out by one or more computers with one or more data processing units. The term "data processing unit" may be understood as any type of entity that enables processing of data or signals. The data or signals can be treated, for example, according to at least one (i.e., one or more than one) special function which is performed by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA) or any combination thereof. Any other way of implementing the respective functions described in more detail herein may also be understood as a data processing unit or logic circuit assembly. One or more of the method steps described in detail here can be executed (e.g., implemented) by a data processing unit by one or more special functions that are performed by the data processing unit.

The approach of FIG. 2 is used for testing a program, for example control software for a robot device. The term "robot device" may be understood to refer to any technical system, such as a computer-controlled machine, a vehicle, a household appliance, a power tool, a production machine, a personal assistant or an access control system. The control software can also be used for data-processing systems, such as a navigation device.

The method of FIG. 2 is carried out, for example, by a test arrangement (e.g., the computer 100 and target device 106 in FIG. 1).

Although specific embodiments have been depicted and described herein, a person skilled in the art will recognize that the specific embodiments shown and described may be replaced with a variety of alternative and/or equivalent implementations without departing from the scope of protection of the present invention. This application is intended to cover any adaptations or variations of the specific embodiments discussed herein.

What is claimed is:

1. A method for testing a computer program, the method comprising the following steps:
   executing the computer program until a memory allocation command is activated for allocating a memory region;
   expanding the memory region by a protection zone having at least one memory location;
   allocating the expanded memory region;
   setting a watchpoint on each of one or more memory locations of the protection zone;
   continuing the execution of the computer program; and
   displaying, for each set watchpoint, that the computer program has a bug when the set watchpoint is triggered;
   wherein the protection zone contains at least one memory location in front of and at least one memory cell behind the memory region, and at least one watchpoint is set on a memory location of the protection zone in front of the memory region and at least one watchpoint is set on a memory location of the protection zone behind the memory region.

2. The method according to claim 1, further comprising:
   deleting the at least one watchpoint set on the memory location of the protection zone in front of the memory region and the at least one watchpoint set on the memory location of the protection zone, in response to releasing the memory region.

3. The method according to claim 1, further comprising:
   executing the computer program on an embedded system, and setting the at least one watchpoint on the memory location of the protection zone in front of the memory region, the at least one watchpoint on the memory location of the protection zone behind the memory region, and breakpoints in the computer program using a test system connected to the embedded system.

4. The method according to claim 1, further comprising:
   adapting information about a position of the memory region in the memory in accordance with a shift in the position of the memory region due to expanding the memory region through the protection zone.

5. The method according to claim 1, wherein the memory region is expanded by the protection zone using a debugger.

6. The method according to claim 1, further comprising:
   testing the computer program using fuzzing with a plurality of test cases, wherein each of the test cases specifies a corresponding set of memory allocation commands and, for each of the memory allocation commands of the set specified for the test case, includes executing the computer program until the memory allocation command is activated for allocating a memory region, expanding the memory region by a protection zone having at least one memory location, allocating the expanded memory region, setting a watchpoint on each of the at least one memory location of the protection zone, continuing the execution of the computer program; and displaying, for each set watchpoint, that the computer program has a bug when the set watchpoint is triggered.

7. The method according to claim 6, wherein the computer program is a control program for a robot device, and the robot device is controlled depending on a result of testing the computer program with the computer program.

8. A test arrangement comprising a computer and a target device, the test arrangement configured to test a computer program for the target device, the test arrangement being configured to:

execute the computer program until a memory allocation command is activated for allocating a memory region;

expand the memory region by a protection zone having at least one memory location;

allocate the expanded memory region;

set a watchpoint on each of one or more memory locations of the protection zone;

continue the execution of the computer program; and display, for each set watchpoint, that the computer program has a bug when the set watchpoint is triggered;

wherein the protection zone contains at least one memory location in front of and at least one memory cell behind the memory region, and at least one watchpoint is set on a memory location of the protection zone in front of the memory region and at least one watchpoint is set on a memory location of the protection zone behind the memory region.

9. A non-transitory computer-readable medium on which are stored commands for testing a computer program, the commands, when executed by a processor, causing the processor to perform the following steps:

executing the computer program until a memory allocation command is activated for allocating a memory region;

expanding the memory region by a protection zone having at least one memory location;

allocating the expanded memory region;

setting a watchpoint on each of one or more memory locations of the protection zone;

continuing the execution of the computer program; and displaying, for each set watchpoint, that the computer program has a bug when the set watchpoint is triggered;

wherein the protection zone contains at least one memory location in front of and at least one memory cell behind the memory region, and at least one watchpoint is set on a memory location of the protection zone in front of the memory region and at least one watchpoint is set on a memory location of the protection zone behind the memory region.

* * * * *